Dec. 12, 1950     L. CRISTIANI     2,533,719
DEVICE FOR FOUR COLOR STEREOSCOPIC CINEMATOGRAPHY
BASED ON ADDITIONAL SYNTHESIS
Filed Aug. 12, 1947
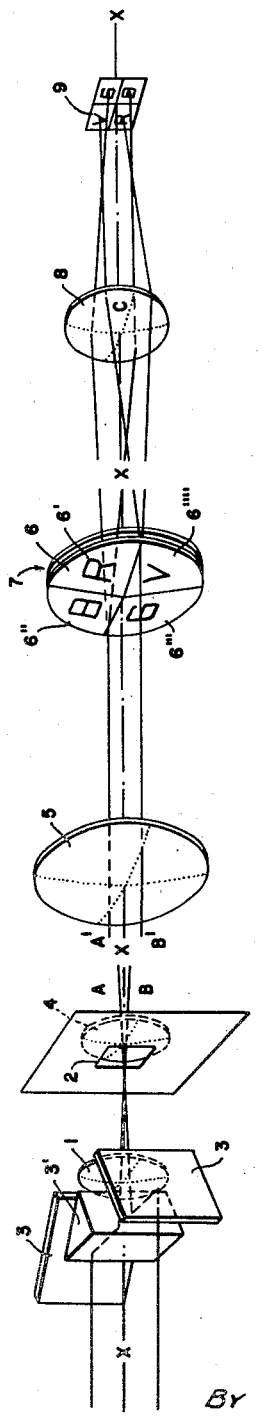
INVENTOR
LUIGI CRISTIANI,
BY
PATENT AGENT Patented Dec. 12, 1950

2,533,719

UNITED STATES PATENT OFFICE 2,533,719

DEVICE FOR FOUR-COLOR STEREOSCOPIC CINEMATOGRAPHY BASED ON ADDITIONAL SYNTHESIS

Luigi Cristiani, Firenze, Italy

Application August 12, 1947, Serial No. 768,210
In Italy July 3, 1943

Section 1, Public Law 690, August 8, 1946
Patent expires July 3, 1963

4 Claims. (Cl. 88—16.6)

Devices for steroscopic cinematography are known, wherein a stereoscopic pair of images is taken on a sensitized film by means of two objectives disposed at a distance either in fixed or regulatable position. The projection is then effected on a screen, by putting before the light rays relating to both images two polarising filters perpendicular one to another. The vision is effected through a pair of polarising oculars coordinated to the projection polarising filters, said oculars precisely causing the light having formed the left image to arrive only at the left eye of the observer and likewise the light coming from the right image to arrive only at the right eye of the observer. The screen must of course be so formed as not to disturb the polarisation state of the pencils projected upon it.

It is also known that the taking of stereoscopic images can be effected without employing two objectives as it has been said above, this being obtained by putting a double pair of mirrors or prisms before a single objective so as to have two stereoscopic images disposed one near the other.

It is however evident that such devices are not perfect as they cause a "sketching," that is to say, a uniform distribution of the light in the field of the image; further the single objective works with a field double than that due to a single image.

With the known processes above mentioned it is also possible to obtain a colour stereoscopic projection, as is easy to be understood, by employing a film sensitive to the colours and able to be treated, for instance, with known processes for obtaining colored images.

The present invention has for an object a device for taking and projecting stereoscopic colour cinematographs, wherein both normal films for white and black and normal taking, developing, printing and projection machines are employed, only by substituting the ordinary taking and projecting objectives with more complex optical groups, as hereinafter described. Further said device makes use of both a screen adapted for the projection and a suitable ocular for the observer. As shown in the annexed schematic drawing in which for graphical necessities the scheme has been broken off in three sections, it is to be understood that these sections are aligned one to the other along the middle axis X—X, with interposition of a space occupied by straight lines joining the points A—A' and B—B' between the first and the second section, said joining lines indicating the direction of the light rays, the total representation of which being superfluous.

As seen in the annexed drawing, the device comprises an objective lens 1, for instance a normal objective for taking a cinematographic picture, which forms an image of the external subject on a window or field diaphragm 2. Said diaphragm can have for instance the size of the cinematographic photogram. A double pair of mirrors 3, 3' is disposed immediately before said objective. The exterior or outer pair 3 has the elements distant as much as it is necessary for providing the desired stereoscopic basis, this basis being able to be variable in any way whatever, whilst both inner mirrors 3' are such as to each utilise half of the objective surface. The orientations of the mirrors are such that both images of a subject at an infinite distance are formed exactly superposed on the window 2, the images of subjects placed at different distances being on the contrary displaced of the quantities relating to the parallax pertaining to the same. The above mentioned double pair of mirrors can be substituted by either one pair of mirrors and a right prism or two rhombic prisms or any other system of mirrors or prisms adapted to produce the desired effect. The stereoscopic basis, as it has been above said, can be either fixed or mechanically adjustable by means of a suitable displacement or rotation of the mirrors or prisms. Further the objective 1 can be formed in such a manner as to have the entry pupil disposed before the lenses composing it, to the end of facilitating the separation of the pencils by means of the mirrors 3, 3'. In the neighbourhood of the window 2 there is a field lens 4, which collects all pencils coming from the objective 1 and conveys the same to an objective 5.

The system of lenses 5 and 4 has the focus in the window 2, so that the rays coming out from the objective 5 form a parallel pencil. Further the system 1, 4, 5 forms on a plane 6 downstream disposed with respect to it an image of the edge separating the pair of mirrors 3'. Thus in the plane 6 a complete separation of the light pencils coming from the right and respectively left image is obtained. On said plane 6 is placed a pyramidal prism of glass with four faces 6', 6'', 6''', 6'ᵛ, this prism having the vertex on the optical axis and being so disposed that two edges may coincide with the image of the separating edge; thus two faces of the prism will be invested by the pencils coming from the left image. Each face of the pyramid limits a deviating prism which deviates for an identical angle the parallel pencils falling in a direction corresponding to a diagonal of the window 2. In this manner there are four prisms deviating according to the diagonals of the window 2, two of said prisms displacing the light coming from the right image and two that of the left image. In the immediate neighbourhoods of the plane 6 there are four colored filters 7, each of which covers a single prismatic face. The selected colours, besides that they form a selecting system for tetrachromic reproduction, are two by two complemental. The filters are so disposed that both prismatic faces working on the right image may be provided with a pair of complemental filters and likewise both other faces working on the left image.

The pencils, which have traversed the prism are all deviated in such a manner as to cross each other in a point C, where an objective 8 is placed. This objective forms in its focal plane 9 four images so displaced as to find themselves to one near the other in a single rectangle. Two of said images are right and two left, each pair being selected according to fundamental colours. The focal distances of the objectives 4, 5, 8 are so chosen that each of the four images assumes half of the size of the normal one, so that the group of the four images covers the normal cinematographic size.

In projection the light coming from the four photograms arranged one near the other crosses in opposite direction the optical system being substantially formed and disposed like that for the taking. Thus the pyramidal prism 6 recomposes the four images on the window 2, but the filter 7 must be disposed for projection on the opposite side of the prism 6, said filter being more complexed. The projection filters for the chromatic recomposition comprise polarising filters disposed in such a manner that the pencils, respectively, coming from the right and the left image may be rectilinearly polarised at right angle between them. In this manner the light coming from both right photograms is colored by a pair of complemental colours (corresponding to that for the taking) and polarised in a single direction, a like effect taking place for both left photograms. In the window 2 on account of the recomposition due to the pyramidal prism there are two bichromic images forming a stereoscopic couple the pencils of which are rectilinearly polarised at right angles between them.

The projection objective projects said stereoscopic colored couple on the screen. It is evident that in case no parallax does exist (for instance for the images of the objects at the infinite) there is a single colored image on the screen. The screen must be such that the light conveyed by it towards the spectator may not be sensibly depolarised. An example of such a screen is given by a ground glass observed by transmission. The observer is provided with a pair of analysing oculars wherein before each eye a rectilinear polarising filter is disposed, said filter being similar to the corresponding filter only the light coming from the right image arriving at the right eye, and likewise the left eye may receive only the light of the left image. Said polarising filters must be as achromatic as possible as not to sensibly alter the colours. Both pairs of fundamental colours divide in a coarse manner the visible spectrum in four consecutive zones; a pair comprises the first and the third zone, the other pair comprising the second and the fourth zone. As the filters are formed with rather wide strips and the colours to be retaken never are rigorously spectral, the assurance is given that any particular whatever of the subject will be registered in at least one of the right images and at least one of the left images with an intensity sufficient for securing the stereoscopic seeing of the same. Thus the stereoscopic effect will be always complete, whatever the disposition of the colours in the subject to be retaken may be.

Further the complemental nature of the filters has the effect that each pair may have gray and white dominant tones, assuring for each eye a natural seeing, which does not fatigue.

In the polarising oculars the polarising element can be also reduced to a little zone before the pupil, as the spectator, even if he is near the screen, fixes the same by utilizing a very limited angle of visual field. This brings both a remarkable economy of polarising matters and a bettering of the stereoscopic sense depending on the almost total exclusion from the visual field of each object which does not make part of the subject to be rebuilt. It is not necessary to particularly illustrate an example of these oculars, wherein the polarising material only occupies a little window so disposed as to present itself to the eye pupil.

As many possible embodiments may be made of the above invention, and as many changes might be made in the embodiment above set forth, it is to be understood that all matters hereinbefore disclosed or shown in the accompanying drawing are to be interpreted as illustrative and not in a limiting sense.

Having thus described the invention, what is claimed as new and desired to be secured by Letters Patent, is:

1. An optical device for stereoscopic color cinematography comprising a forward objective, a double pair of mirrors immediately disposed before said forward objective and spaced so as to provide a stereoscopic basis, a window, a field lens for collecting pencils coming from said forward objective, an intermediate objective to which said pencils are conveyed, the focus of said field lens and said intermediate objective being positioned in said window, whereby rays of light coming from said intermediate objective form parallel pencils, a pyramidal prism provided with four faces and having the vertex disposed to coincide with the optical axis, two of said prismatic faces displacing light rays coming from the right image, the other two faces displacing light rays coming from the left image, filter means adjacent said pyramidal prism and covering each a single prismatic face, and a rear objective placed rearwardly of said filter means for projecting the pairs of images adjacent each other onto a surface.

2. A device according to claim 1, wherein said forward objective forms the stereoscopic image on a field diaphragm disposed in the focal plane, so that the images of objects at infinite distance are superposed at said field diaphragm.

3. A device according to claim 1, wherein said filter means are so disposed that the right images are selected according to a pair of complemental colors, and the left images are similarly selected according to a pair of complemental colors.

4. A device according to claim 3, wherein said filter means approximately divide the visible spectrum in four zones, said four zones corresponding to the pairs of complemental colors.

LUIGI CRISTIANI.

REFERENCES CITED

The following references are of record in the file of this patent:

UNITED STATES PATENTS

| Number | Name | Date |
| --- | --- | --- |
| 1,657,270 | Muller et al. | Jan. 24, 1928 |
| 2,053,689 | Barnes | Sept. 8, 1936 |
| 2,152,224 | Thomas | Mar. 28, 1939 |
| 2,200,466 | Cristiani et al. | May 14, 1940 |
| 2,282,947 | Sherbinin | May 12, 1942 |
| 2,283,466 | Schensted | May 19, 1942 |
| 2,348,410 | Pastor | May 9, 1944 |

FOREIGN PATENTS

| Number | Country | Date |
| --- | --- | --- |
| 409,506 | Italy | Feb. 20, 1945 |